US008127624B2

(12) United States Patent
Hashimoto et al.

(10) Patent No.: US 8,127,624 B2
(45) Date of Patent: Mar. 6, 2012

(54) PARTICULATE SAMPLING APPARATUS, PARTICULATE SAMPLING SUBSTRATE AND PARTICULATE SAMPLING METHOD

(75) Inventors: Gakuji Hashimoto, Kanagawa (JP); Motohiro Furuki, Tokyo (JP); Kenji Sugawara, Kanagawa (JP)

(73) Assignee: Sony Corporation, Tokyo (JP)

( * ) Notice: Subject to any disclaimer, the term of this patent is extended or adjusted under 35 U.S.C. 154(b) by 709 days.

(21) Appl. No.: 12/257,355

(22) Filed: Oct. 23, 2008

(65) Prior Publication Data

US 2009/0107262 A1 Apr. 30, 2009

(30) Foreign Application Priority Data

Oct. 25, 2007 (JP) ................................ P2007-277082

(51) Int. Cl.
*G01N 1/22* (2006.01)

(52) U.S. Cl. .................................................... 73/863.11

(58) Field of Classification Search ......................... None
See application file for complete search history.

(56) References Cited

U.S. PATENT DOCUMENTS

| | | | | |
|---|---|---|---|---|
| 6,224,732 | B1 | 5/2001 | Imasaka et al. | |
| 2005/0207940 | A1 | 9/2005 | Butler et al. | |
| 2006/0051214 | A1 | 3/2006 | Ussing | |
| 2006/0163119 | A1 | 7/2006 | Hirano et al. | |
| 2008/0196778 | A1 * | 8/2008 | Baroud et al. | 137/827 |
| 2009/0090422 | A1 * | 4/2009 | Baroud et al. | 137/827 |

FOREIGN PATENT DOCUMENTS

| | | |
|---|---|---|
| JP | 7-24309 | 1/1995 |
| JP | 2001-158099 | 6/2001 |
| JP | 2003-107099 | 4/2003 |
| JP | 2004-167479 | 6/2004 |
| JP | 2005-300333 | 10/2005 |
| JP | 2005-538287 | 12/2005 |
| JP | 2006-296913 | 11/2006 |
| JP | 2006-325700 | 12/2006 |
| JP | 2007-504446 | 3/2007 |
| JP | 2009-103624 | 5/2009 |

OTHER PUBLICATIONS

Collection of Lectures of No. 66 Analytic Chemistry Panel Discussion, p. 23, B2011 (2005).

Notification of Reasons for Refusal dated Jun. 15, 2010, from the Japanese Patent Office in corresponding Japanese Patent Application No. 2007-277082.

* cited by examiner

*Primary Examiner* — Robert R Raevis

(74) *Attorney, Agent, or Firm* — Finnegan, Henderson, Farabow, Garrett & Dunner, L.L.P.

(57) ABSTRACT

A particulate sampling apparatus configured to control the flow direction of a dispersion solvent for particulates, at a channel branching section of a channel includes an introduction channel capable of introducing the dispersion solvent, and a plurality of branch channels communicating with the introduction channel, so as to disperse desired ones of the particulates into a selected one of the branch channels, wherein the apparatus includes light irradiation means by which a bubble can be generated in the dispersion solvent by irradiation with a laser beam used as a heat source, and the flow direction of the dispersion solvent at the channel branching section is controlled by the bubble.

10 Claims, 7 Drawing Sheets

PARTICULATE SAMPLING APPARATUS, PARTICULATE SAMPLING SUBSTRATE AND PARTICULATE SAMPLING METHOD

CROSS REFERENCES TO RELATED APPLICATIONS

The present invention contains subject matter related to Japanese Patent Application JP 2007-277082 filed with the Japan Patent Office on Oct. 25, 2007, the entire contents of which being incorporated herein by reference.

BACKGROUND OF THE INVENTION

1. Field of the Invention

The present invention relates to a particulate sampling apparatus, a particulate sampling substrate and a particulate sampling method. More particularly, the invention relates to a particulate sampling apparatus and the like in which sampling of particulates is conducted by controlling the flow direction of the particulates by use of a bubble generated through irradiation with a laser beam.

2. Description of the Related Art

In recent years, there have been developed microchips in which reaction regions or channels for performing chemical or biological analysis are provided on a silicon or glass substrate by application of microprocessing technologies in the semiconductor industry. The microchips have come to be utilized, for example, for electrochemical detectors in liquid chromatography, small-type electrochemical sensors in medical sites, etc.

Analytical systems using such microchips are generically called μ-TAS (micro-total-analysis system), laboratory-on-chip, biochip or the like, and has drawn attention as a technology which makes it possible to achieve higher speed, higher efficiency and higher degree of integration with regard to chemical and biological analyses and to achieve reductions in size of analyzers.

Particularly, the μ-TAS is being expected to be applied to biological analysis in which precious trace amounts of samples or a multiplicity of specimens are treated, since the μ-TAS makes it possible to analyze tiny amounts of samples and to put microchips to disposable use.

Examples of application of the μ-TAS to biological analysis include a particulate sampling technology in which characteristics of particulates such as cells are optically analyzed in a channel or channels provided on a microchip and a population satisfying predetermined conditions is fractionally collected from the particulates.

As a particulate sampling technology, a particulate fractionating apparatus utilizing laser trapping is disclosed in Japanese Patent Laid-open No. Hei 7-24309 (hereinafter referred to as Patent Document 1). In this particulate fractionating apparatus, particles such as cells being in movement are irradiated with a scanning beam so that acting forces according to the kinds of the particles are exerted on the particles, thereby sampling (fractionally collecting) the particles. Japanese Patent Laid-open No. 2004-167479 (hereinafter referred to as Patent Document 2) discloses a similar technology, specifically, a particulate collecting apparatus which utilizes an optical force or optical pressure. In this particulate collecting apparatus, a channel for flow of particulates is irradiated with a laser beam in a direction intersecting the flow direction of the particulates so that the moving direction of the particulates to be collected is deflected toward the converging direction of the laser beam, thereby collecting the objective particulates.

Besides, Japanese Patent Laid-open No. 2003-107099 (hereinafter referred to as Patent Document 3) discloses a particulate collecting microchip having an electrode for controlling the moving direction of particulates. The electrode is disposed in the vicinity of a channel port leading from a particulate measuring zone to a particulate fractionating channel, and the moving direction of the particulates is thereby controlled.

SUMMARY OF THE INVENTION

For sampling of cells and the like, cell sorters in which sorting of particulates is conducted by a waterdrop charging (electrifying) system have hitherto been used. In the sorting based on the waterdrop charging system, a stream of water containing particulates such as cells is jetted as waterdrops from a nozzle, with a plus or minus electric charge applied to the waterdrops. While the waterdrops pass between deflecting electrode plates in their course of dropping, the waterdrops containing the desired particulates are electrically drawn toward the deflecting electrode plate, whereby the dropping direction of the objective waterdrops is changed, and the objective drops are thereby sampled.

Such a cell sorter according to the related art has had a problem in that, for example, at the time of sampling cells, the cells may be damaged by the electric charges applied to the waterdrops. In addition, an ultrasound generating device for producing the waterdrops and the deflecting electrodes would enlarge the apparatus in size and raise the cost thereof.

From this point of view, the apparatuses disclosed in Patent Document Nos. 1 and 2 are based on the sampling by use of the optical force (pressure) of the laser beam, so that there is no need for an ultrasound generating device or deflecting electrodes, and the apparatus can fabricated in a reduced size and at a suppressed cost. However, in regard of sampling of cells, the possibility for the cells to be damaged by irradiation with the laser beam is still left to be solved.

Besides, the microchip described in Patent Document 3 has a structure in which the electrodes for controlling the moving direction of particles are disposed on a substrate. Therefore, the mechanism of the microchip itself is complicated, possibly leading to a cost problem.

Thus, there is a need for a particulate sampling apparatus, a particulate sampling substrate and a particulate sampling method such that, especially in sampling cells, the samples can be sampled while suppressing damage to the cells, and the microchip and the apparatus themselves do not need any complicated mechanism.

In accordance with an embodiment of the present invention, there is provided a particulate sampling apparatus for controlling the flow direction of a dispersion solvent for particulates, at a channel branching section of a channel including an introduction channel capable of introducing the dispersion solvent and a plurality of branch channels communicating with the introduction channel, so as to disperse desired ones of the particulates into a selected one of the branch channels. The apparatus includes light irradiation unit by which a bubble can be generated in the dispersion solvent by irradiation with a laser beam used as a heat source, and the flow direct-on of the dispersion solvent at the channel branching section is controlled by the bubble.

In the particulate sampling apparatus, the channel may be disposed on a substrate.

Preferably, the light irradiation unit is so configured as to be able to generate the bubble in the dispersion solvent in the branch channel, and the flow direction of the dispersion solvent at the channel branching section is controlled on the basis of an increased in flow resistance inside the branch channel due to the generated bubble.

Besides, the light irradiation unit may be so configured as to be able to generate the bubble in the dispersion solvent in a chamber communicating with the introduction channel, and the flow direction of the dispersion solvent at the channel branching section may be controlled on the basis of the discharge pressure of the dispersion solvent discharged from the chamber due to the generated bubble. Incidentally, in this case, preferably, the aperture diameter of a communicating port through which the chamber communicates with the introduction channel is set to be smaller than the diameter of the particulates.

Further, the light irradiation unit may have a beam scanning unit operative to scanningly apply the laser beam to the branch channel or the chamber and/or a light modulating unit for controlling the intensity of the laser beam.

In the case where a plurality of the channels are provided, preferably, the beam scanning unit is so configured as to be able to scanningly apply the laser beam to the branch channels or the chambers of all the channels.

In addition, according to another embodiment of the present invention, there is provided a particulate sampling substrate for controlling the flow direction of a dispersion solvent for particulates, at a channel branching section of a channel including an introduction channel capable of introducing the dispersion solvent and a plurality of branch channels communicating with the introduction channel, so as to disperse desired ones of the particulates into a selected one of the branch channels. The flow direction of the dispersion solvent at the channel branching section is controlled by a bubble generated in the dispersion solvent by irradiation with a laser beam used as a heat source.

Furthermore, according to a further embodiment of the present invention, there is provided a particulate sampling method for controlling the flow direction of a dispersion solvent for particulates, at a channel branching section of a channel including an introduction channel capable of introducing the dispersion solvent and a plurality of branch channels communicating with the introduction channel, so as to disperse desired ones of the particulates into a desired one of the branch channels. A bubble is generated in the dispersion solvent by irradiation with a laser beam used as a heat source, and the flow direction of the dispersion solvent at the channel branching section is controlled by the bubble.

Here, in the present invention, the "particulate sampling apparatus" widely includes apparatuses for optically measuring and sampling such particulates as bio-related particulates, e.g., cells, microorganisms, ribosome, etc. or synthetic particles, e.g., latex particles, gel particles, industrial particles, etc. The objective cells include animal cells (blood cells) and plant cells. The microorganisms include bacteria, such as colibacilli, etc., viruses such as tobacco mosaic virus, etc., and fungi such as yeast, etc. The biopolymer substances include chromosome, ribosome, mitochondria, organelle (cell organelle), etc. In addition, the industrial particles may, for example, be particles of organic or inorganic polymers, metals, etc. The organic polymer materials include polystyrene, styrene-divinylbenzene, polymethyl methacrylate, etc. The inorganic polymer materials include glass, silica, magnetic materials, etc. The metals include gold colloid, aluminum, etc. The particulates are normally spherical in shape, but may be non-spherical in shape; besides, the particulates are not particularly limited as to size and mass.

Based on the present invention, it is possible to provide a particulate sampling apparatus, a particulate sampling substrate and a particulate sampling method by which, at the time of sampling cells, the cells can be sampled while suppressing damage to the cells and in which a microchip and the apparatus themselves do not need any complicated mechanism.

DETAILED DESCRIPTION OF THE PREFERRED EMBODIMENTS

Figure 1:
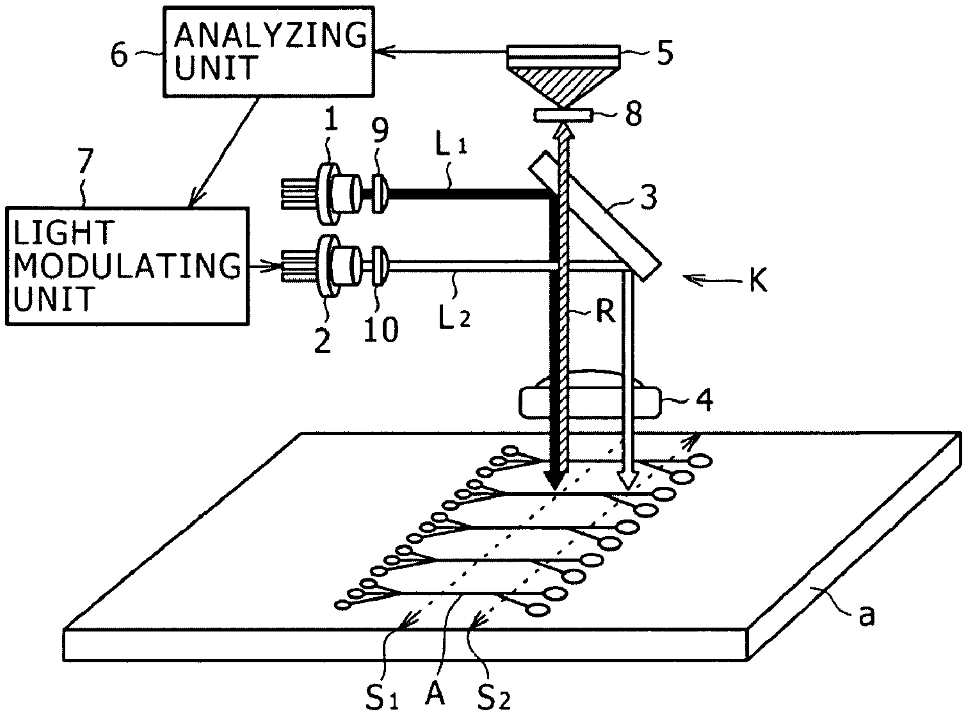
FIG. 1 is a schematic illustration of the configuration of a particulate sampling apparatus according to one embodiment of the present invention.

Now, preferred modes of carrying out the present invention will be described below, referring to the drawings. Incidentally, the embodiments described below are representative examples of embodiment of the present invention, and the invention is not to be construed in a scope limited by the embodiments.

FIG. 1 is a schematic illustration of the configuration of a particulate sampling apparatus K according to one embodiment of the present invention.

The particulate sampling apparatus K includes: channels A which are each disposed on a substrate a and through which a dispersion solvent for particulates can be introduced; a laser beam source 1 for radiating a laser beam $L_1$ (see the void arrow in the figure) for optical measurement of the particulates; a laser beam source 2 for radiating a laser beam $L_2$ (see the black arrow in the figure) used as a heat source; a scanning unit 3 for scanningly applying the laser beam $L_1$ and the laser beam $L_2$; and an objective lens 4 for condensing the laser beam $L_1$ and the laser beam $L_2$ to predetermined positions of the channels A. In the figure, symbols 9 and 10 denote collimator lenses for converting each of the laser beam $L_1$ and the laser beam $L_2$ coming from the laser beam source 1 and the laser beam source 2 into parallel rays.

In addition, the particulate sampling apparatus K has a photo detector 5 for detecting a to-be-detected light R (see the shaded arrow in the figure) generated from the particulate in the channel upon irradiation with the laser beam $L_1$ (hereinafter referred to as "the measuring laser beam $L_1$"). The to-be-detected light R generated from the particulate in the channel A is condensed by the objective lens 4, and is transmitted through the scanning unit 3, to be guided into a photo detector 5.

Further, the particulate sampling apparatus K includes an analyzing unit 6 for analyzing data outputted from the photo detector 5, and a light modulating unit 7 which receives analytical results outputted from the analyzing unit 6 and controls the intensity of the laser beam $L_2$ radiated from the laser beam source 2.

The substrate a is formed by use of a material which is a glass or one of various plastics (PP, PC, COP, PDMS), which transmits the laser beam $L_1$ and the laser beam $L_2$ therethrough, which shows little wavelength dispersion with respect to the measuring laser beam $L_1$ and the laser beam $L_2$, and which produces little optical error. Where the substrate a is made from a glass, the channels are transferred by wet etching or dry etching. Where the substrate a is made of a plastic, the channels are formed on the substrate by nanoimprinting or molding. The substrate thus formed with the channels can be sealed with a cover by use of the same material as the substrate.

The measuring laser beam $L_1$ is made to scan a predetermined position on the substrate by the scanning unit 3, so as to irradiate therewith the particulate introduced into the channel A, at that position of the channel A which corresponds to the scanning line (see the dotted arrow $S_1$ in the figure).

Similarly, the laser beam $L_2$ is also made to scan a predetermined position on the substrate a by the scanning unit 3, so as to generate a bubble in the dispersion solvent introduced into the channel A, at that position of the channel A which corresponds to the scanning line (see the dotted arrow $S_2$ in the figure). Here, the "bubble" means a bubble generated in the dispersion solvent through evaporation of the dispersion solvent upon irradiation with the laser beam $L_2$ serving as a heat source. Hereinafter, the laser beam $L_2$ will be referred to as "the bubble-generating laser beam $L_2$."

For the measuring laser beam $L_1$, the laser beam source 1 is appropriately selected from known light sources such as argon, helium or other gas lasers, semiconductor lasers (LD), light emitting diodes (LED), etc. according to the particulates to be sampled and the purpose of the sampling, whereby a laser beam of any of various wavelengths can be selectively used.

Besides, for the bubble-generating laser beam $L_2$, a direct transducer element such as semiconductor lasers (LD), light-emitting diodes (LED), etc. with high-accuracy output control and high response performance is preferably adopted in order to enable a high-accuracy high-speed temperature control. Further, it is desirable to use a semiconductor laser (LD) excellent in single-wavelength property (coherency) and capable of being condensed into a microscopic region, in order to generate the bubble accurately at a predetermined position in the channel A. When a semiconductor laser (LD) provided with a resonator in a diode chip is used, it is possible to obtain a higher output, to shorten the time of irradiation with laser beam, and to realize a higher-speed temperature control, as compared with the case of a light emitting diode (LED).

The scanning unit 3 is disposed as a polygon mirror, a galvano mirror, an acousto-optical element, an electro-optic element, or the like on optical paths of the measuring laser beam $L_1$ and the bubble-generating laser beam $L_2$ emitted respectively from the laser beam source 1 and the laser beam source 2. In FIG. 1, the scanning unit 3 includes a dichroic mirror so that the measuring laser beam $L_1$ and the bubble-generating laser beam $L_2$ can be integrally made to scan.

The scanning of the measuring laser beam $L_1$ and the bubble-generating laser bean $L_2$ effected by the scanning unit 3 is performed with a fixed cycle time (period). For example, with the dichroic mirror rotated at high speed, scanning at about 30,000 rpm can be achieved.

The irradiation with the measuring laser beam $L_1$ and the bubble-generating laser beam $L_2$ is desirably carried out by a telecentric optical system such that the irradiation with each laser beam occurs orthogonally to each channel, and the spot width of each laser beam is constant at those positions (image formation plane of laser beam) of the channel A which correspond to the scanning line $S_1$ and the scanning line $S_2$.

Upon irradiation with the measuring laser beam $L_1$, the to-be-detected light R generated from the particulate having been introduced into that position in the channel A which corresponds to the scanning line $S_1$ is detected by the photo detector 5. In FIG. 1, a multi-channel photomultiplier tube (PMT) is used as the photo detector 5 so that wavelength-based detection can be made upon grating the to-be-detected light R by the spectroscope 8.

The to-be-detected light R may be scattered light of forward scattering for measurement of the size of the particulates to be measured, or may be scattered light of side-way scattering, fluorescence, Rayleigh scattering, Mie scattering or the like for measurement of the structure of the particulates to be measured. In addition, the fluorescent light may be coherent fluorescent light incoherent fluorescent light.

The photo detector 5 amplifies the light of each wavelength detected, converts the light into an electrical signal, and outputs the electrical signal to the analyzing unit 6. The analyzing unit 6 analyzes the optical characteristics of the particulates, based on the electrical signal inputted from the photo detector 5, and outputs to the light modulating unit 7 the results of analysis of whether the particulate under consideration is to be sampled or not. In response to the analytical results outputted from the analyzing unit 6, the light modulating unit 7 controls the intensity of the bubble-generating laser beam $L_2$ emitted from the laser beam source 2 so as to generate a bubble in the dispersion solvent introduced into the channel A at that position in the channel A which corresponds to the scanning line S2.

Now, a method of sampling the particulate by the bubble generated in the dispersion solvent by the bubble-generating laser beam $L_2$ will be described below.

Figure 2:
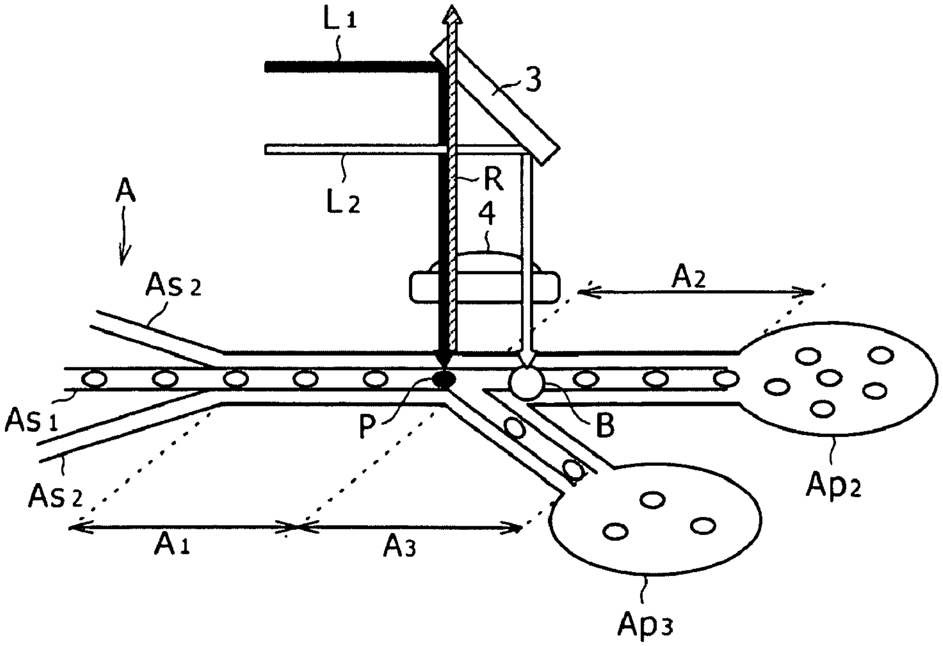
FIG. 2 is an illustration of a first embodiment of the particulate sampling method in the particulate sampling apparatus.

FIG. 2 is an illustration of a first embodiment of the particulate sampling method in the particulate sampling apparatus K.

FIG. 2 shows schematically and in an enlarged form one of the channels A disposed on the substrate a shown in FIG. 1. While the case where five channels A are provided on the substrate a is shown in FIG. 1, the number of the channels A formed on the substrate a is not particularly limited, and one or more channels A may be provided as required.

As shown in FIG. 2, the channel A includes an introduction channel $A_1$ through which a dispersion solvent for particulates is introduced, and a branch channel $A_2$ and a branch channel $A_3$ which communicate with the introduction channel $A_1$. Hereinafter, the communicating section where the introduction channel $A_1$ communicates with the branch channel $A_2$ and the branch channel $A_3$ will be referred to as "the channel branching section."

At one-side ends of the branch channel $A_2$ and the branch channel $A_3$, a sample pooling section $Ap_2$ and a sample pooling section $Ap_3$ for pooling the particulates are provided.

Further, the channel A has a sample channel $As_1$ for introducing the dispersion solvent for the particulates into the introduction channel $A_1$, and sheath channels $As_2$, $As_2$ for introducing solvent laminar flows (sheath flows) into the introduction channel $A_1$. The dispersion solvent for the particulates introduced through the sample channel $As_1$ is introduced into the introduction channel $A_1$ as a laminar flow positioned at a central part of the inside of the channel by the solvent laminar flows introduced from the two sheath channels $As_2$. In this case, the particulates are arranged at regular intervals in the laminar flow, as shown in the figure.

As shown in FIG. 2, each of the particulates thus arranged at regular intervals in the introduction channel $A_1$ is irradiated with the measuring laser beam $L_1$ at a position corresponding to the scanning line of the measuring laser beam $L_1$ which is denoted by symbol $S_1$ in FIG. 1. In the figure, the particulate irradiated with the measuring laser beam $L_1$ is denoted by symbol P.

As above-mentioned, the to-be-measured light R generated from the particulate P upon irradiation with the measuring laser beam $L_1$ is detected by the photo detector 5 (see FIG. 1), and is converted into an electrical signal, which is outputted to the analyzing unit 6. Then, the light modulating unit 7 receives the results of determination of whether the particulate P is to be sampled or not, outputted from the analyzing unit 6. When the particulate P is determined to be sampled, the light modulating unit 7 controls the intensity of the bubble-generating laser bean $L_2$ radiated from the laser beam source 2, so as to generate a bubble (see symbol B in the figure) in the dispersion solvent at a position, corresponding to the scanning line $S_2$, of the branch channel $A_2$ or the branch channel $A_3$. In the present figure, there is shown the case where the bubble is generated in the dispersion solvent in the branch channel $A_2$.

In the particulate sampling apparatus K, the flow direction of the dispersion solvent at the channel branching section, or the flow direction of the particulate P there, is controlled based on an increase in the flow resistance generated in the branch channel $A_2$ or the branch channel $A_3$ by the generation of the bubble, whereby the particulate P is selectively guided into either of the branch channel $A_2$ and the branch channel $A_3$, and is stored in either of the sample pooling section $Ap_2$ and the sample pooling sect-on $Ap_3$.

Now, based on FIGS. 3 and 4, the method of controlling the flow direction of the dispersion solvent at the channel branching section by the bubble generated by the bubble-generating laser beam $L_2$ will be described in detail below.

Figure 3:
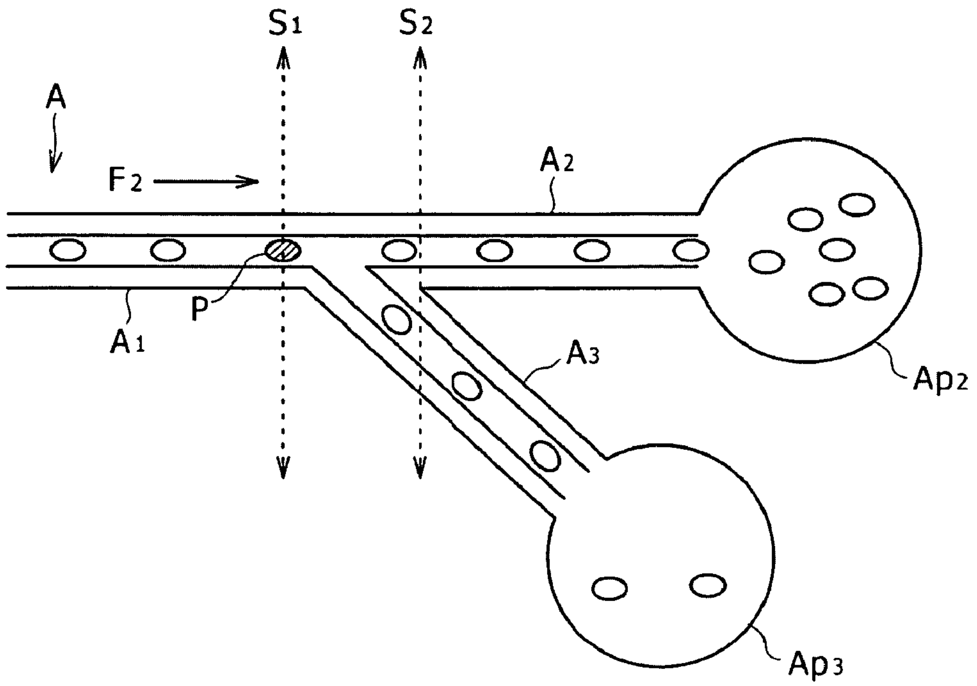
FIG. 3 is a drawing (first embodiment) showing the flow direction at a channel branching section in the case where a particulate is determined not to be sampled by an analyzing unit.

FIG. 3 is an illustration (top plan view) showing the flow direction at the channel branching section in the case where it is determined by the analyzing unit 6 that the particulate P is not to be sampled.

The channel A is so configured that the particulate introduced into the introduction channel $A_1$, in its normal state (the state of being not to be sampled), is permitted to flow into the branch channel $A_2$ communicating rectilinearly with the introduction channel $A_1$ (see arrow $F_2$ in the figure).

Therefore, in the case where it is determined by the analyzing unit 6 that the particulate P is not to be sampled, generation of a bubble by the bubble-generating laser beam $L_2$ is conducted at neither of the positions, corresponding to the scanning line $S_2$, in the branch channel $A_2$ and the branch channel $A_3$, whereby it is ensured that the particulate P is guided into the branch channel $A_2$, to be stored into the sample pooling section $Ap_2$.

Figure 4:
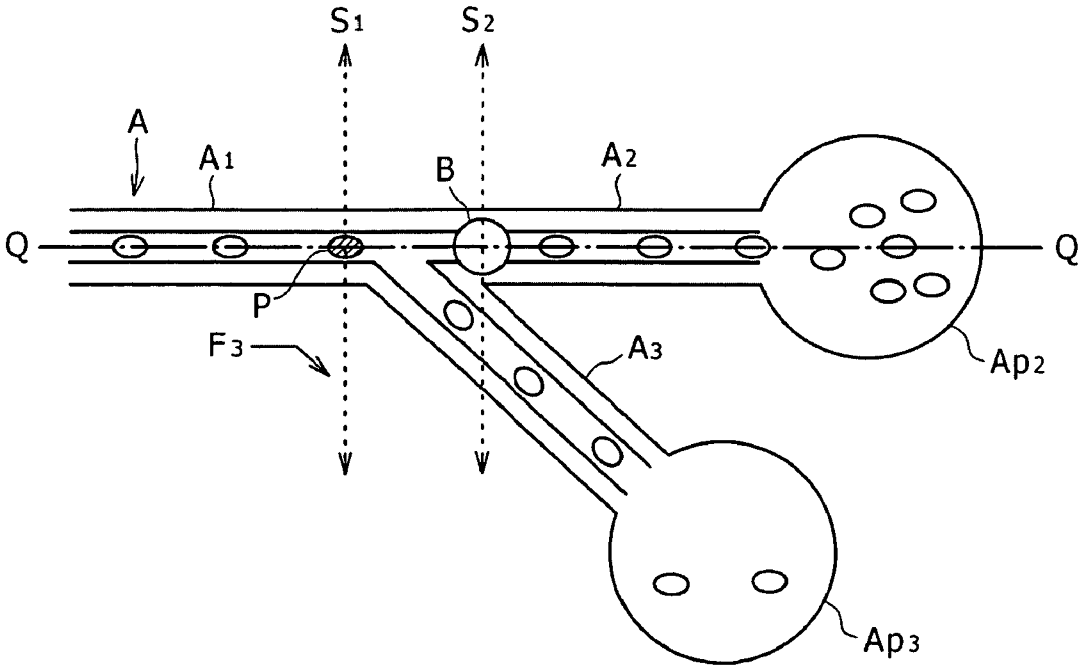
FIG. 4 is a drawing (first embodiment) showing the flow direction at the channel branching section in the case where a particulate is determined to be sampled by the analyzing unit.

FIG. 4 shows the flow direction at the channel branching section in the case where it is determined by the analyzing unit 6 that the particulate P is to be sampled.

When it is determined by the analyzing unit 6 that the particulate P is to be sampled, a bubble B is generated in the dispersion solvent at a position, corresponding to the scanning line $S_2$, in the branch channel $A_2$ by the bubble-generating laser beam $L_2$. With the bubble B thus generated, a pressure loss is induced in the branch channel $A_2$, and the flow resistance in the branch channel $A_2$ is increased, so that the flow in the branch channel $A_2$ stagnates temporarily, and the dispersion solvent flowing from the introduction channel $A_1$ is made to flow into the branch channel $A_3$ (see arrow $F_3$ in the figure). As a result, the dispersion solvent containing the particulate P can be guided into the branch channel $A_3$, and the particulate P can be sampled into the sample pooling section $Ap_3$.

Figure 5A:
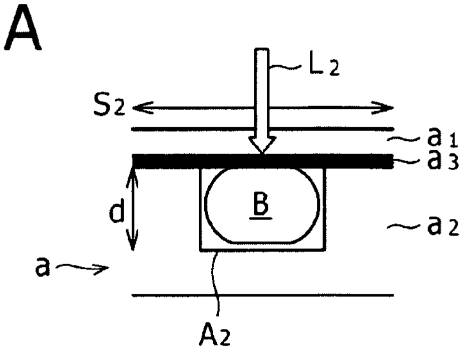
FIGS. 5A and 5B are sectional views of substrate including a branch channel along a scanning line in FIG. 4, and a sectional view of the substrate a including the branch channel along line Q-Q.
Figure 5B:
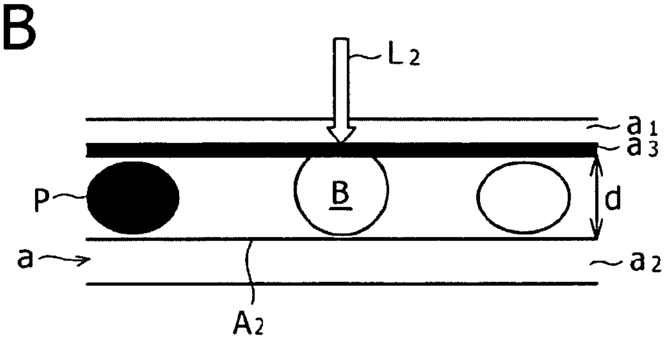

FIG. 5A shows a sectional view of the substrate a including the branch channel $A_2$ along the scanning line $S_2$ in FIG. 4, and FIG. 5B shows a sectional view of the substrate a including the branch channel $A_2$ along line Q-Q in FIG. 4. In the figures, the vicinity of the bubble B is shown in an enlarged form.

The substrate a includes an upper layer part denoted by symbol $a_1$ in the figure, a lower layer part formed with the channel A and denoted by symbol $a_2$ in the figure, and a heat accumulating layer $a_3$ provided between the upper layer part $a_1$ and the lower layer part $a_2$, and is so configured that the bubble-generating laser beam $L_2$ is transmitted through the upper layer part $a_1$ to irradiate the heat accumulating layer $a_3$ therewith.

The heat accumulating layer $a_3$ is provided so as to convert the energy of the bubble-generating laser beam $L_2$ into heat, which heats and evaporates the dispersion solvent introduced to the position, corresponding to the scanning line $S_2$, in the branch channel $A_2$, thereby generating the bubble B.

Accordingly, the heat accumulating layer $a_3$ is desirably formed from a material which is excellent in light absorbency at the wavelength of the bubble-generating laser beam $L_2$ and has a high melting point. Examples of the material for the heat accumulating layer $a_3$ include metals such as iron, nickel, cobalt, chromium, aluminum, copper, zinc, tin, etc., alloys based on these metals, such as stainless, carbon steel, brass, capro-nickel, aluminum alloys, etc., and ceramics such as alumina, zirconia, titania, silicon nitride, silicon carbide, etc. The heat accumulating layer $a_3$ is formed by coating, spraying, atomization, welding, or spotting of the material.

With the heat accumulating layer $a_3$ thus formed from a material high in light absorbency, the bubble B can be generated, substantially instantaneously, by irradiation with the bubble-generating layer beam $L_2$. In addition, the dispersion solvent can be evaporated at high speed and homogeneously to thereby induce film boiling, whereby a vapor layer for obviating the heating of the dispersion solvent in the periphery of the bubble B can be formed, and the particulate contained in the dispersion solvent in the periphery of the bubble B can be prevented from being damaged due to excessive heating. This, especially in the case where the particulates ate cells, contributes to improvement of the survival rate of the cells.

For the purpose of transmitting the bubble-generating laser beam $L_2$ into the heat accumulating layer $a_3$, the upper layer part $a_1$ of the substrate a is formed from a material which permits transmission of the bubble-generating laser beam $L_2$ therethrough. As the material for the upper layer part $a_1$, for example, a glass or plastic which shows a light transmitting property for the wavelength of the bubble generating laser beam $L_2$ is adopted.

Incidentally, the heat accumulating layer $a_3$ does not constitute a component indispensable to the generation of the bubble B by the bubble generating laser beam $L_2$. Particularly in the case where the depth of the channel (the thickness of the dispersion solvent) d is not less than about 1 mm, the dispersion solvent itself introduced to the position, corresponding to the scanning line $S_2$, in the branch channel $A_2$ absorbs the optical energy of the bubble-generating laser beam $L_2$, whereby the bubble B can be generated at a sufficient speed. The heat accumulating layer $a_3$ is provided in the case where the depth d of the channel is less than about 1 mm and where the light absorbency of the dispersion solvent itself is insufficient.

Besides, in the case where the heat accumulating layer $a_3$ is provided, the position thereof is not limited to the upper surface side of the branch channel $A_2$ as sown in the figure, and may be provided on the side surface side or the bottom surface side of the branch channel $A_2$ insofar as it fronts on the dispersion solvent in the branch channel $A_2$. Furthermore, in the case where the substrate a (the upper layer part $a_1$ and the lower layer part $a_2$) permits transmission of the bubble-generating laser beam $L_2$ therethrough, the position of the heat accumulating layer $a_3$ is not limited to the surface, and the heat accumulating layer $a_3$ can be provided in the inside layer on the upper surface side, the side surface side or the bottom surface side of the branch channel $A_2$ insofar as the bubble-generating laser beam $L_2$ can reach the heat accumulating layer $a_3$ and the heat from the heat accumulating layer $a_3$ can be transferred to the dispersion solvent.

Based on FIG. 4, again, the timing for generation of the bubble B by the bubble-generating laser beam $L_2$ will be described below.

The generation of the bubble B by the bubble-generating laser beam $L_2$ is carried out with an appropriate timing when the particle P irradiated with the measuring laser beam $L_1$ scanning along the scanning line $S_1$ flows into the channel branching section. Control of the timing for irradiation with the bubble-generating laser beam $L_2$ is realized by control of the intensity of the bubble-generating laser beam $L_2$ by the light modulating unit 7 (see FIG. 1).

As has been described above, in the particulate sampling apparatus K, the scanning of the measuring laser beam $L_1$ and the bubble-generating laser beam $L_2$ is integrally carried out by the scanning unit 3 (see FIG. 1). Besides, since this scanning is performed with an extremely short cycle time (period) (for example, 30,000 rpm), the measuring laser beam $L_1$ and the bubble-generating laser beam $L_2$ scan respectively along the scanning line $S_1$ and the scanning line $S_2$ a number of times while the particulate P irradiated with the measuring laser beam $L_1$ on the scanning line $S_1$ arrives at the channel branching section. The light modulating unit 7 raises the intensity of the bubble-generating laser beam $L_2$ or switches the bubble-generating laser beam $L_2$ from OFF to ON, at an appropriate timing during when the bubble-generating laser bean $L_2$ scans a number of times, whereby the bubble B is generated in the dispersion solvent in the branch channel $A_2$, and the particulate P is guided into the branch channel $A_3$.

After the extinction of the bubble, the flow resistance in the branch channel $A_2$ is reduced, and stagnation of the flow in the branch channel $A_2$ is canceled, so that the dispersion solvent for the particulates is permitted to flow from the introduction channel $A_1$ into the branch channel $A_2$ as has been described referring to FIG. 3 above (see arrow $F_2$ in FIG. 3).

This results in that the next one of the particulates arranged at regular intervals in the introduction channel $A_1$ is permitted to flow onto the scanning line $S_1$ of the measuring laser beam $L_1$, and sampling (or non-sampling) of this particulate is performed in the same procedure as above-described.

In this case, if the bubble B generated in the dispersion solvent in the branch channel $A_2$ is maintained for too long a time, the particulate(s) not intrinsically to be guided into the branch channel $A_3$ might also be sampled into the sample pooling section $Ap_3$.

Such a situation is liable to occur in the case where a large-sized bubble is generated due to excessive heating of the dispersion solvent at the time of evaporating the dispersion solvent by irradiation with the bubble-generating laser beam $L_2$. This is because air is lower than the solvent in heat transfer coefficient, so that the heat inside the large-sized bubble is not easily dissipated and does not easily disappear.

Therefore, in order to accurately sample the particulates permitted to flow in the state of being arrayed at regular intervals in the introduction channel $A_1$, it may be necessary to form the bubble B in an appropriate size so that the flow in the branch channel $A_2$ is made to stagnate for a necessary and sufficient time for guiding one particulate into the branch channel $A_3$ (the method for generating a bubble in an appropriate size will be described later, referring to FIGS. 11A to 14F).

Incidentally, similarly, in the case of not sampling the particulate P as shows in FIG. 3, a bubble B can be generated at the position, corresponding to the scanning line $S_2$, in the branch channel $A_3$ by the bubble-generating laser beam $L_2$ so that the particulate P is securely made to flow into the branch channel $A_2$, to be stored into the sample pooling section $Ap_2$.

As has been described above, in the first embodiment of the particulate sampling method in the particulate sampling apparatus K, based on the results of determination of whether the particulate P is to be sampled or not, outputted from the analyzing unit 6, the light modulating unit 7 controls the intensity of the bubble-generating laser bean $L_2$ so as to generate the bubble in the dispersion solvent in the branch channel, whereby the particulate P can be sampled on the basis of an increase in flow resistance in the branch channel due to the bubble.

While the case where two branch channels are provided and where the particulates are fractionated into two populations according to their optical characteristics has been described as an example referring to FIGS. 2 to 4 above, provision of more than two branch channels is also possible.

Figure 6:
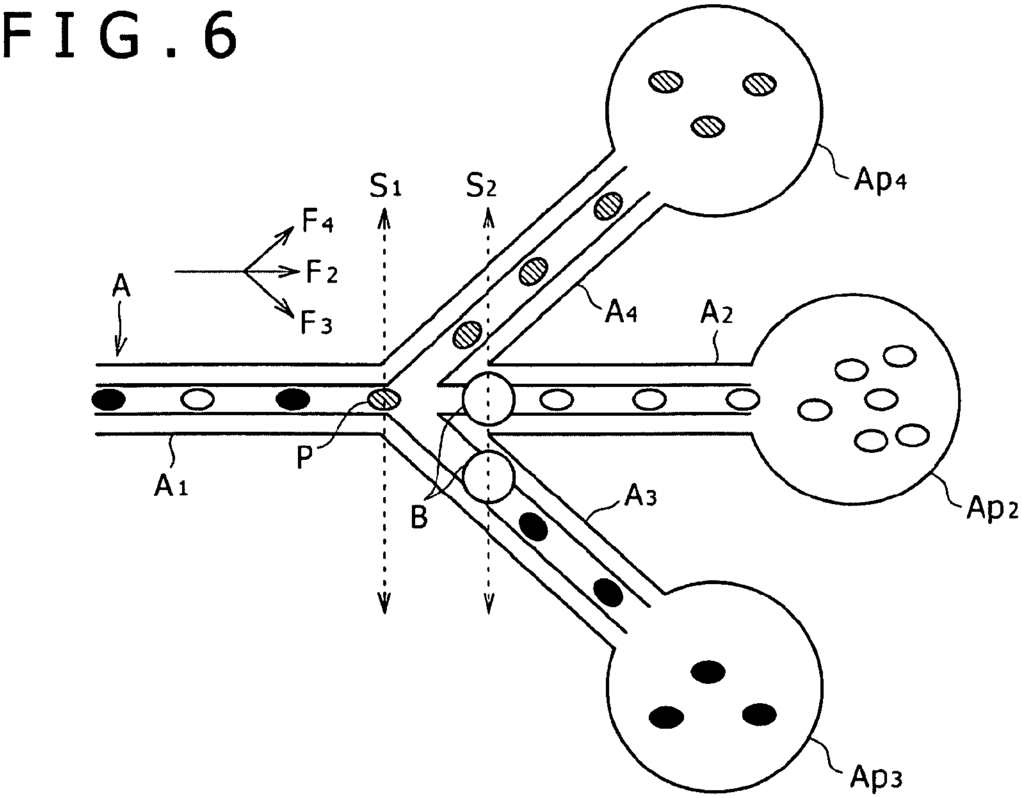
FIG. 6 is an illustration (first embodiment) of a sampling method in a channel provided with three branch channels.

FIG. 6 shows a channel A having three branch channels.

The channel A shown in FIG. 6 is provided with a branch channel $A_4$ in addition to a branch channel $A_2$ and a branch channel $A_3$, as branch channels which communicate with an introduction channel $A_1$. At one end of the branch channel $A_4$, a sample pooling section $Ap_4$ for pooling particulates is provided.

The channel A shown in FIG. 6 is so configured that the particulate introduced into the introduction channel $A_1$, in its normal state (the state of being not to be sampled), is permitted to flow into the branch channel $A_2$ communicating rectilinearly with the introduction channel $A_1$ (see arrow $F_2$ in the figure).

Therefore, in the case where it is determined by the analyzing unit 6 that the particulate P is not to be sampled, generation of a bubble by the bubble-generating laser beam $L_2$ is conducted at neither of the positions, corresponding to the scanning line $S_2$, in the branch channel $A_2$, the branch channel $A_3$ and the branch channel $A_4$, whereby the particulate P is guided into the branch channel $A_2$, to be stored into the sample pooling section $Ap_2$.

On the other hand, in the case where it is determined by the analyzing unit 6 that the particulate P is to be sampled, bubbles B may be generated in the branch channel $A_2$ and the branch channel $A_3$ at positions corresponding to the scanning line $S_2$ as shown in FIG. 6, whereby the particulate P can be guided into the branch channel $A_4$, to be sampled into the sample pooling section $Ap_4$ (see arrow F4 in the figure).

Also, the bubbles B may be generated in the branch channel $A_2$ and the branch channel $A_4$ at positions corresponding to the scanning line $S_2$, whereby the particulate P can be guided into the branch channel $A_3$, to be sampled into the sample pooling section $Ap_3$.

Thus, according to the channel A shown in FIG. 6, the particulates can be fractionated into three populations according to their optical characteristics.

Further, while one of the channels A has been schematically shown in an enlarged form in FIGS. 2 to 6 and described, a plurality of channels A are provided on the substrate a as has been described referring to FIG. 1, and the measuring laser bean $L_1$ and the bubble-generating laser beam $L_2$ are made by the scanning unit 3 to scan along the scanning line $S_1$ and the scanning line $S_2$, whereby the above-mentioned optical measurement and sampling of the particulates are performed simultaneously with respect to all the channels A.

Now, another specific example of the method of sampling particulates by use of the bubble(s) generated in the dispersion solvent by the bubble-generating laser beam $L_2$ will be described below.

Figure 7:
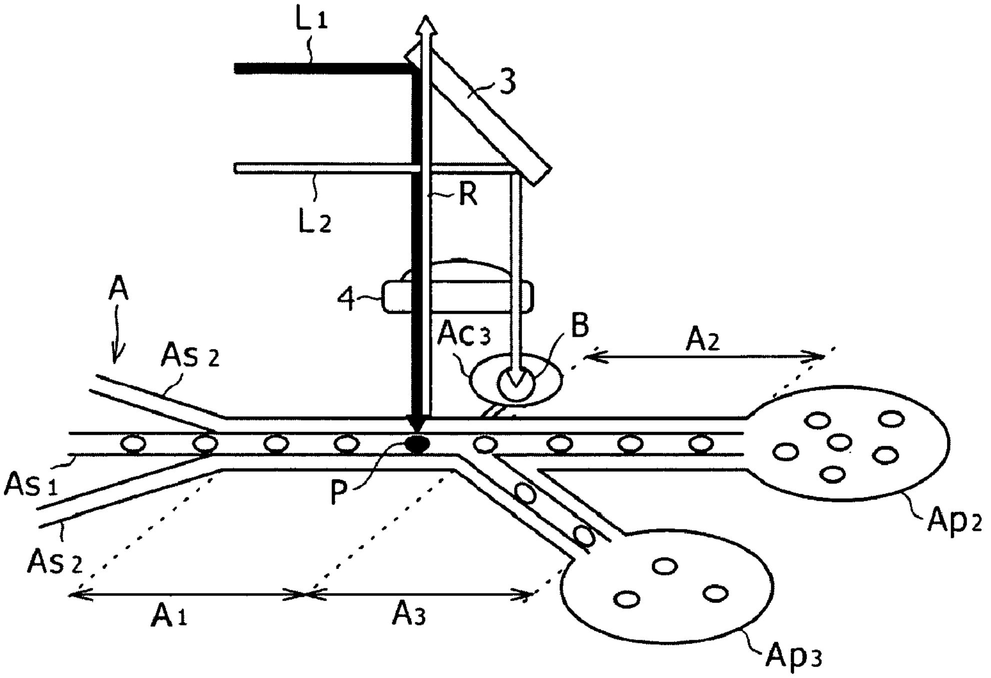
FIG. 7 is an illustration of a second embodiment of the particulate sampling method in a particulate sampling apparatus.

FIG. 7 is an illustration of a second embodiment of the particulate sampling method in the particulate sampling apparatus K.

FIG. 7 shows, in an enlarged form, one of the channels A disposed on the substrate a shown in FIG. 1.

As shown in FIG. 7, the channel A includes an introduction channel $A_1$ through which a dispersion solvent for particulates is introduced, a branch channel $A_2$ and a branch channel $A_3$ communicating with the introduction channel $A_1$, and, further, a chamber $Ac_3$ communicating with the introduction channel $A_1$. The chamber $Ac_3$ is provided on the opposite side of the branch channel $A_3$ with respect to the introduction channel $A_1$, and is made to communicate with the introduction channel $A_1$ just on the upstream side (the introduction channel $A_1$ side) of the channel branching section where the introduction channel $A_1$ communicates with the branch channel $A_2$ and the branch channel $A_3$.

Besides, like in FIG. 2, a sample pooling section $Ap_2$ and a sample pooling section $Ap_3$ for pooling the particulates are provided at one-side ends of the branch channel $A_2$ and the branch channel $A_3$.

In addition, a sample channel $As_1$ for introducing the dispersion solvent for the particles into the introduction channel $A_1$ and sheath channels $As_2$ for introducing solvent laminar flows (sheath flows) into the introduction channel $A_1$ are configured in the same manner as described referring to FIG. 2 above.

As shown in the figure, each of the particulates arrayed at regular intervals in the introduction channel $A_1$ is irradiated with a measuring laser beam $L_1$ at a position corresponding to a scanning line of the measuring laser beam $L_1$ denoted by symbol $S_1$ in FIG. 1. In the figure, the particulate irradiated with the measuring laser beam $L_1$ is denoted by symbol P.

In response to the results of determination outputted from the analyzing unit 6 based on to-be-measured light R generated from the particulate P upon irradiation with the measuring laser beam $L_1$, in the case where the particulate P is to be sampled, the light modulating unit 7 controls the intensity of the bubble-generating laser beam $L_2$ radiated from a laser beam source 2 so as to generate a bubble (see symbol B in the figure) in the dispersion solvent, in the same manner as has been described referring to FIG. 2 above. However, there is a difference between the two systems. In FIG. 2, the bubble has been generated in the branch channel $A_2$ or the branch channel $A_3$ at a position corresponding to the scanning line $S_2$. On the other hand, in FIG. 7, the bubble B is generated in the chamber $Ac_3$ at a position corresponding to the scanning line $S_2$.

In the particulate sampling apparatus K, the flow direction of the dispersion solvent at the channel branching section, or the flow direction of the particulate P there, is controlled based on the discharge pressure of the dispersion solvent discharged out of the chamber $Ac_3$ by the generation of the bubble B, whereby the particulate P is guided selectively into either of the branch channel $A_2$ and the branch channel $A_3$, to be stored into either of the sample pooling section $Ap_2$ and the sample pooling section $Ap_3$.

Now, based on FIGS. 8 and 9, the method of controlling the flow direction of the dispersion solvent at the channel branching section by the bubble generated by the bubble-generating laser beam $L_2$ will be described specifically.

Figure 8:
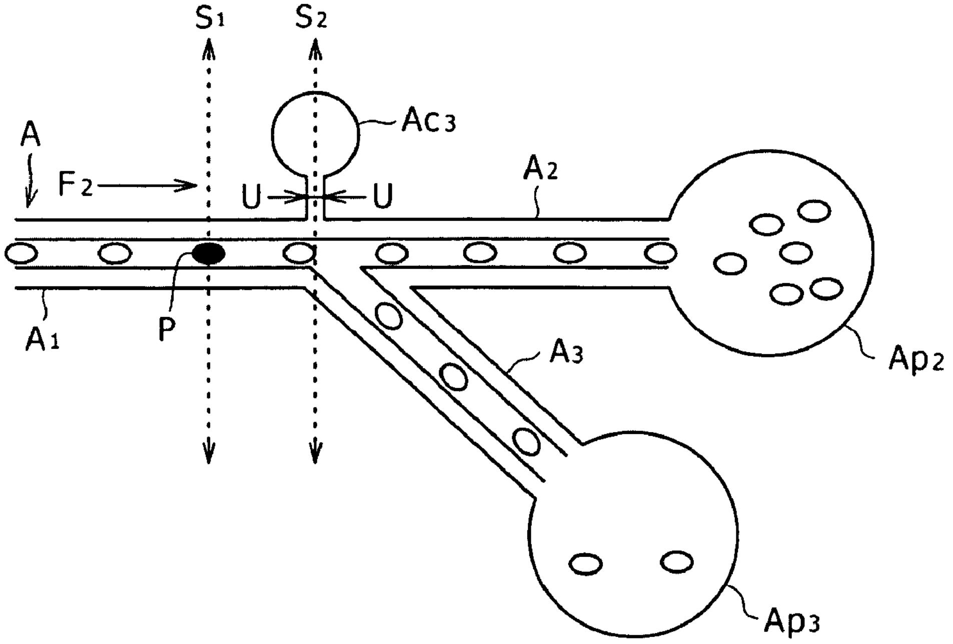
FIG. 8 is a drawing (second embodiment) showing the flow direction at a channel branching section in the case where a particulate is determined not to be sampled by the analyzing unit.

FIG. 8 is an illustration of the flow direction at the channel branching section in the case where it is determined by the analyzing unit 6 that the particulate P is not to be sampled.

The aperture diameter (the distance U-U in the figure) of the communicating port where the chamber $Ac_3$ communicates with the introduction channel $A_1$ is set to be smaller than the diameter of the particulates. Therefore, when the dispersion solvent for the particulates is introduced into the channel A, only the dispersion solvent passes through the communicating port, and the chamber $Ac_3$ is filled up with the dispersion solvent. In this case, the particulate is never introduced into the chamber $Ac_3$.

In the channel A, each of the particulates introduced into the introduction channel $A_1$, in its normal state (the state of being not to be sampled), is let flow into the branch channel $A_2$ communicating rectilinearly with the introduction channel $A_1$ (see arrow $F_2$ in the figure).

Therefore, when it is determined by the analyzing unit 6 that the particulate P is not to be sampled, generation of the bubble in the dispersion solvent introduced into the chamber $Ac_3$ by the bubble-generating laser beam $L_2$ is not conducted, whereby the particulate P is guided into the branch channel $A_2$, to be stored into the sample pooling section $Ap_2$.

Figure 9:
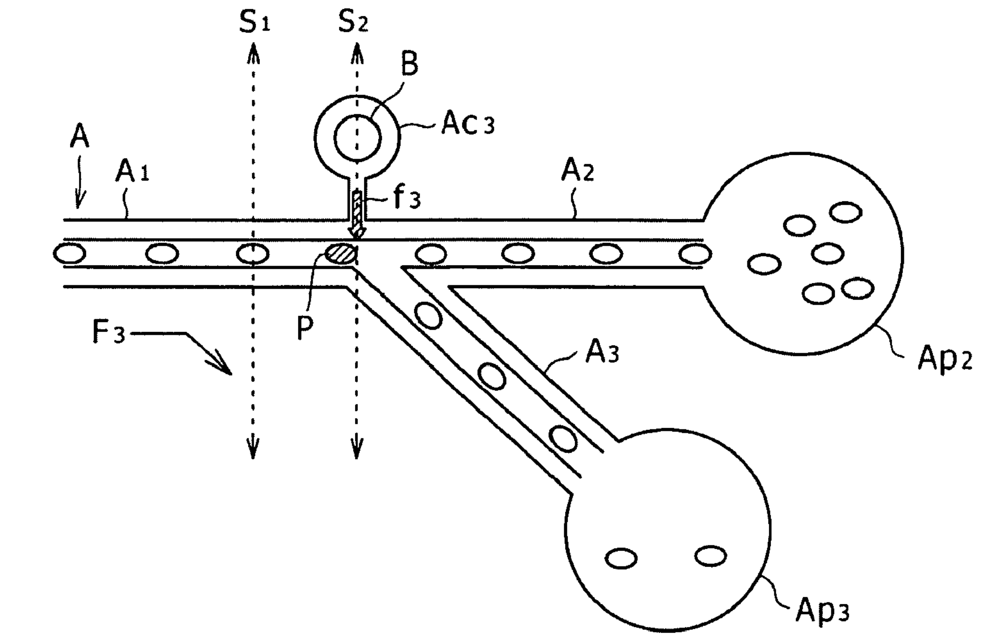
FIG. 9 is a drawing (second embodiment) showing the flow direction at the channel branching section in the case where a particle is determined to be sampled by the analyzing unit.

FIG. 9 illustrates the flow direction at the channel branching section in the case where it is determined by the analyzing unit 6 that the particulate P is to be sampled.

When it is determined by the analyzing unit 6 that the particulate P is to be sampled, a bubble B is generated in the dispersion solvent in the chamber $Ac_3$ at a position corresponding to the scanning line $S_2$ by the bubble-generating laser bean $L_2$. With the bubble B thus generated, the dispersion solvent filling up the chamber $Ac_3$ is discharged into the introduction channel $A_1$ (see arrow $f_3$ in the figure). By the discharge pressure of the dispersion solvent thus discharged, the dispersion solvent flowing from the introduction channel $A_1$ is urged to flow into the branch channel $A_3$ (see arrow $F_3$ in the figure). As a result, the particulate P is guided into the branch channel $A_3$, to be sampled into the sample pooling section $Ap_3$.

The generation of the bubble B by the bubble-generating laser beam $L_2$ is conducted at the timing when the particulate P irradiated with the measuring laser beam $L_1$ scanning along the scanning line $S_1$ (see FIG. 1) flows by the communicating port where the chamber $Ac_3$ communicates with the introduction channel $A_1$ (just on the upstream side of the channel branching section). Control of the timing for irradiation with the bubble-generating laser beam $L_2$ is realized by controlling the intensity of the bubble-generating laser beam $L_2$ by the light modulating unit 7 (see FIG. 1).

Specifically, the intensity of the bubble generating laser beam $L_2$, which is made to scan along the scanning line $S_2$ a plurality of times until the particulate P irradiated with the measuring laser beam $L_1$ on the scanning line $S_1$ reaches the communicating port where the chamber $Ac_3$ communicates with the introduction channel $A_1$, is raised or switched from OFF to ON by the light modulating unit 7 at the time when the particulate P reaches the communicating port where the chamber $Ac_3$ communicates with the introduction channel $A_1$, whereby the bubble B is generated in the dispersion solvent in the chamber $Ac_3$, thereby guiding the particulate P into the branch channel $A_3$.

In generating the bubble B in the dispersion solvent in the chamber $Ac_3$ by the bubble-generating laser beam $L_2$, a heat accumulating layer $a_3$ as described referring to FIG. 5 above may be provided in the chamber $Ac_3$, whereby the bubble B can be generated substantially instantaneously by irradiation with the bubble-generating laser beam $L_2$.

As has been described above, in the second embodiment of the particulate sampling method in the particulate sampling apparatus K, based on the results of determination of whether the particulate P is to be sampled or not, outputted from the analyzing unit 6, the light modulating unit 7 controls the intensity of the bubble-generating laser bean $L_2$ so as to generate a bubble in the dispersion solvent in the chamber, and, based on the discharge pressure of the dispersion solvent discharged from the chamber by the bubble, the particulate P can be sampled.

While the case where two branch channels are provided and the particulates are fractionated into two populations according to their optical characteristics has been described as an example referring to FIGS. 7 to 9 above, provision of more than two branch channels is also possible.

Figure 10:
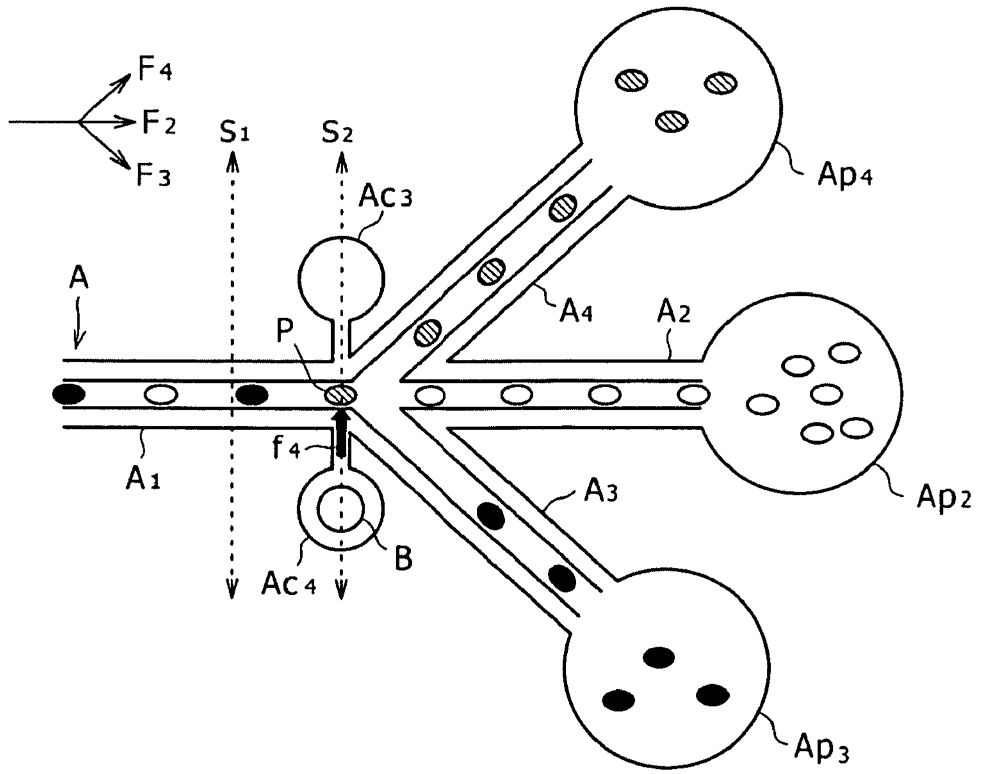
FIG. 10 is an illustration (second embodiment) of a sampling method in a channel provided with three branch channels.

FIG. 10 shows a channel A provided with three branch channels.

The channel A shown in FIG. 10 has a branch channel $A_4$ in addition to a branch channel $A_2$ and a branch channel $A_3$, as branch channels communicating with an introduction channel $A_1$. At one end of the branch channel $A_4$, a sample pooling section $Ap_4$ for pooling particulates is provided. Besides, in addition to a chamber $Ac_3$, a chamber $Ac_4$ communicating with the introduction channel $A_1$ is provided on the opposite side of the chamber $Ac_3$.

The channel A shown in FIG. 9 is so configured that each of the particulates introduced into the introduction channel $A_1$, in its normal state (the state of being not to be sampled), is let flow into the branch channel $A_2$ communicating rectilinearly with the introduction channel $A_1$ (see arrow $F_2$ in the figure).

Therefore, in the case where it is determined by the analyzing unit 6 that the particulate P is not to be sampled, generation of the bubble by the bubble-generating laser beam $L_2$ is conducted neither in the chamber $Ac_3$ nor in the chamber $Ac_4$, whereby the particulate P is guided into the branch channel $A_2$ (see arrow $F_2$), to be stored into the sample pooling section $Ap_2$.

On the other hand, when it is determined by the analyzing unit 6 that the particulate P is to be sampled, a bubble B may be generated in the chamber $Ac_4$ as shown in FIG. 10 by the bubble-generating laser beam $L_2$, whereby the particulate P can be guided into the branch channel $A_4$, to be sampled into the sample pooling section $Ap_4$ (see arrow $F_4$).

Besides, like in FIG. 9, the bubble B may be generated in the chamber $Ac_3$, whereby the particulate P can be guided into the branch channel $A_3$, to be sampled into the sample pooling section $Ap_3$.

In this manner, according to the channel A shown in FIG. 10, the particulates can be fractionated into three populations according to their optical characteristics.

Further, while one of the channels A has been schematically shown in an enlarged form in FIGS. 7 to 10 and described, a plurality of channels A are provided on the substrate a as described referring to FIG. 1 above, and the measuring laser bean $L_1$ and the bubble-generating laser beam $L_2$ are made by the scanning unit 3 to scan along the scanning line $S_1$ and the scanning line $S_2$, whereby optical measurement and sampling of the particulates as above-described are performed simultaneously with respect to all the channels A.

Now, a configuration for generating the bubble B in an appropriate size by irradiation with the bubble-generating laser beam $L_2$ will be described.

As above-mentioned, if a large-sized bubble is generated due to excessive heating of the dispersion solvent in evaporating the dispersion solvent by irradiation with the bubble-generating laser beam $L_2$, the bubble B might be maintained for a long time, possibly making it very difficult to accurately sample the particulates.

In view of this, in the particulate sampling apparatus K, at the time of evaporating the dispersion solvent by irradiation with the bubble-generating laser beam $L_2$, the light modulating unit 7 controls the intensity of the bubble-generating laser beam $L_2$ for irradiation, whereby the bubble B is generated for a necessary and sufficient time for sampling one particulate.

Figure 11A:
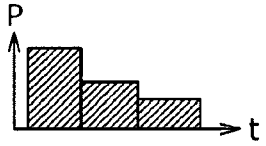
FIGS. 11A to 11F are charts for illustrating a light modulating method for a bubble-generating laser beam by a light modulating unit.
Figure 11B:
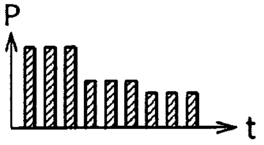
Figure 11C:
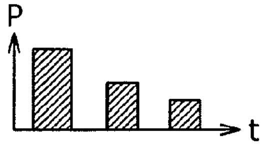
Figure 11D:
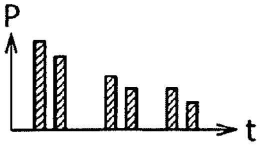
Figure 11E:
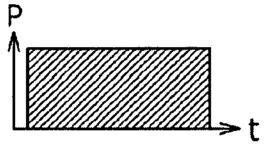
Figure 11F:
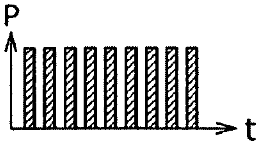

FIGS. 11A to 11F are charts for illustrating the light modulating method for the bubble-generating laser beam $L_2$ by the light modulating unit 7. FIGS. 11A to 11D illustrate light modulating methods according to embodiments of the present invention, while FIGS. 11E and 11F illustrate, for comparison, the cases where light modulation is not conducted. In the figures, the axis of abscissas represents time (t), and the axis of ordinates represents intensity (P).

In the first place, the cases where light modulation is not conducted will be described, based on FIGS. 11E and 11F.

In these cases, the bubble-generating laser beam $L_2$ is radiated always at a constant intensity (see FIG. 11E) or is radiated as pulses with a constant intensity (see FIG. 11F).

Bubbles generated by the bubble-generating laser beams $L_2$ shown in FIGS. 11E and 11F are exemplified in FIGS. 12A to 12F.

Figure 12A:
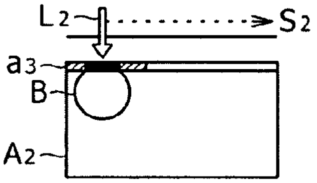
FIGS. 12A to 12F are drawings showing a bubble generated by use of the bubble-generating laser beams $L_2$ shown in FIGS. 11E and 11F.
Figure 12B:
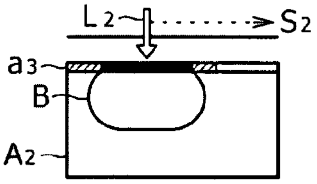
Figure 12C:
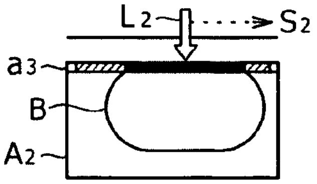
Figure 12D:
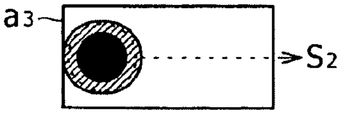
Figure 12E:
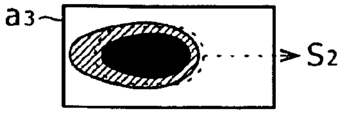
Figure 12F:
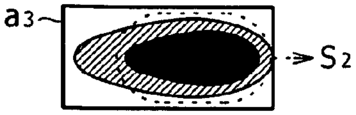

FIGS. 12A to 12C are sectional views (see FIG. 4 also) of the substrate a including the branch channel $A_2$ along the scanning line $S_2$ shown in FIG. 5A, wherein the heat accumulating layer $a_3$ and the branch channel $A_2$ are shown in enlarged form. In addition, FIGS. 12D to 12F are top plan views of the heat accumulating layer $a_3$.

FIGS. 12A to 12F illustrate the scanning operation of the bubble-generating laser beam $L_2$ and time-series variations of temperature distribution in the heat accumulating layer $a_3$. In the heat accumulating layer $a_3$, the black region is a region of a high temperature due to irradiation with the bubble-generating laser beam $L_2$ (hereinafter, this region will be referred to as "the high-temperature region"). In addition, the shaded region is a region of a medium temperature in the periphery of the high-temperature region (hereinafter, this region will be referred to as "the medium-temperature region"). Further, in each of FIGS. 12D to 12F, the region surrounded by dotted line corresponds to the bubble B.

As illustrated in FIGS. 12A to 12C, the bubble-generating laser beam $L_2$ is radiated onto the heat accumulating layer $a_3$ while scanning along the scanning line $S_2$ from the left to the right in the figures. This results in that the high-temperature region and the medium-temperature region of the heat accumulating layer $a_3$ are also moved along the scanning line $S_2$ from the left to the right in the figures, so that the temperature distribution in the heat accumulating layer $a_3$ varies in time sequence as illustrated in FIGS. 12D to 12F.

In this case, each of the bubble-generating laser beams $L_2$ not undergoing light modulation and shown in FIGS. 11E and 11F heats the heat accumulating layer $a_3$ while irradiating the heat accumulating layer $a_3$ therewith at a constant intensity, so that the high-temperature region and the medium-temperature region of the heat accumulating layer $a_3$ are gradually enlarged. Attendant on this, the bubble B generated is further heated and expanded, so as to be gradually enlarged in size as illustrated in FIGS. 12A to 12C.

Thus, in the cases where light modulation of the bubble-generating laser beam $L_2$ is not conducted, the bubble B becomes large in size, causing a problem as to the accuracy of sampling of the particulates, as above-mentioned.

On the other hand, in the irradiation methods using the bubble-generating laser beams $L_2$ as shown in FIGS. 11A to 11D, the laser beam intensity is controlled by the light modulating unit 7 so as to be decreased in time sequence.

Specifically, in FIG. 11A, the intensity of the bubble-generating laser bean $L_2$ is gradually decreased in time sequence. In FIG. 11B, the intensity of the bubble-generating laser beam $L_2$ in a pulsed form is similarly decreased gradually in time sequence.

Besides, in FIG. 11C, the irradiation with the bubble-generating laser bean $L_2$ is conducted in a time division manner in which laser irradiation times and non-irradiation times are provided (hereinafter, this will be referred to also as "the time-division irradiation"), and, further, the intensity of the bubble-generating laser beam $L_2$ is gradually decreased in time sequence. In FIG. 11D, the bubble-generating laser beam $L_2$ in a pulsed form is similarly used for time-division irradiation, and, further, the intensity thereof is gradually decreased in time sequence.

FIGS. 13A to 13F exemplify a bubble generated by use of the bubble-generating laser beam $L_2$ shown in FIG. 11A or 11B, and FIGS. 14A to 14F exemplify bubbles generated by use of the bubble-generating laser beam $L_2$ shown in FIG. 11C or 11D.

Like FIGS. 12A to 12F, FIGS. 13A to 13F and FIGS. 14A to 14F illustrate the scanning operation of the bubble-generating laser beam $L_2$ and time-series variations of the temperature distribution in the heat accumulating layer $a_3$.

Figure 13A:
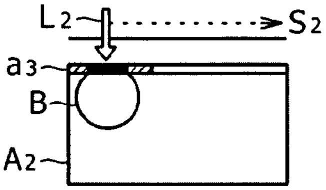
FIGS. 13A to 13F are drawings showing a bubble generated by the bubble-generating laser beam shown in FIG. 11A or 11B.
Figure 13B:
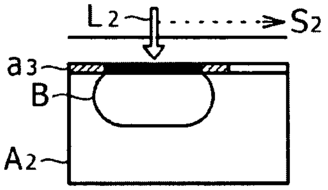
Figure 13C:
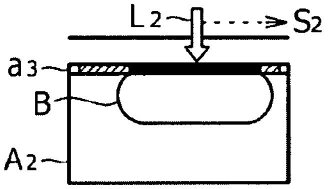

As illustrated in FIGS. 13A to 13C, the bubble-generating laser beam $L_2$ radiates onto the heat accumulating layer $a_3$ while scanning along the scanning line $S_2$ from the left to the right in the figures. This results in that the high-temperature region and the medium-temperature region of the heat accumulating layer $a_3$ are also moved along the scanning line $S_2$ from the left to the right in the figures, and the temperature distribution in the heat accumulating layer $a_3$ varies in time sequence as illustrated in FIGS. 13D to 13F.

In this case, when the intensity of the bubble-generating laser beam $L_2$ is gradually decreased in time sequence as illustrated in FIGS. 11A and 11B, the high-temperature region and the medium-temperature region of the heat accumulating layer $a_3$ can be prevented from being enlarged in size, and the bubble generated can be prevented from becoming large in size.

Figure 13D:
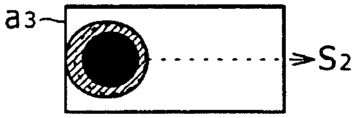
Figure 13E:
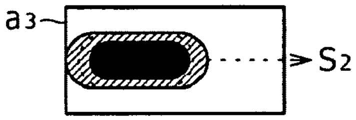
Figure 13F:
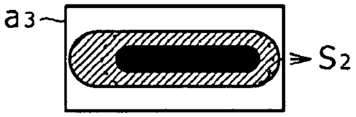

To be more specific, in the beginning stage of bubble generation shown in FIGS. 13A and 13D, irradiation with the bubble-generating laser beam $L_2$ at a high intensity is conducted so as to rapidly heat the heat accumulating layer $a_3$, thereby generating the bubble B. In the subsequent growth stage of the bubble B shown in FIGS. 13B and 13E and FIGS. 13C and 13F, irradiation with the bubble-generating laser beam $L_2$ is conducted while gradually decreasing the laser beam intensity. This ensures that the region having already become the medium-temperature region can be prevented from being excessively heated by a high-intensity laser beam, dissipation of heat at the high-temperature region having been scanned with the bubble-generating laser beam $L_2$ can be promoted, and the high-temperature region and the medium-temperature region can be prevented from being enlarged in size.

Therefore, the bubble B can be restrained from being enlarged in size. Further, the temperature distribution in the heat accumulation layer $a_3$ can be controlled to be uniform belt-like in shape along the scanning line S2 as shown in FIG. 13F, and the bubble B can be formed in a large width in the corresponding region (see FIG. 13C also). With the bubble B thus formed in a large width without becoming excessively large in size, the flow resistance in the branch channel $A_2$ can be increased effectively, and the accuracy of sampling can be further enhanced.

Furthermore, when the bubble-generating laser beam $L_2$ is used in the time division mode and the laser beam intensity is gradually decreased in time sequence as shown in FIGS. 11C and 11D, the high-temperature region and the medium-temperature region of the heat accumulating layer $a_3$ can each be formed in the shape of spots, whereby small-sized bubbles can be formed successively.

Figure 14A:
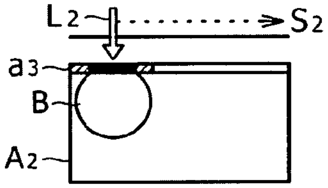
FIGS. 14A to 14F are drawings showing a bubble or bubbles generated by the bubble-generating laser beam shown in FIG. 11C or 11D.
Figure 14B:
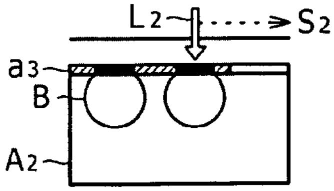
Figure 14C:
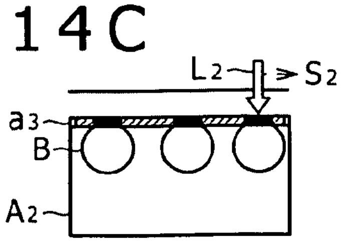
Figure 14D:
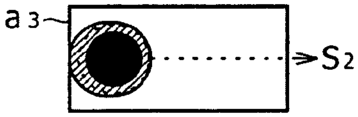
Figure 14E:
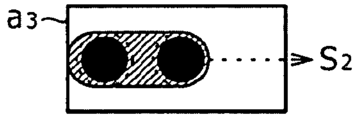
Figure 14F:
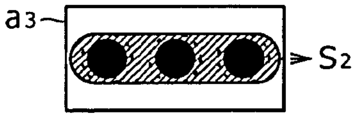

Specifically, with the bubble-generating laser beam $L_2$ set into the mode of time-division irradiation during when the bubble-generating laser beam $L_2$ is scanning across the branch channel $A_2$ along the scanning line $S_2$, the high-temperature regions can be formed in the shape of spots on the heat accumulating layer $a_3$, whereby a plurality of small-sized bubbles can be successively formed at the corresponding positions, as shown in FIGS. 14B and 14E.

Furthermore, in this case, the laser beam intensity may be gradually decreased in time sequence so that the high-temperature regions formed sequentially can be reduced stepwise in size, whereby the bubbles generated in the corresponding positions are made to be gradually reduced in size. Since the bubbles generated formerly are gradually reduced in size due to dissipation of heat, the gradual decrease in the size of the bubbles thus generated successively results in that a multiplicity of bubbles uniform in size can be formed successively.

A small-sized bubble has a large area of contact with the solvent, as compared with its volume, so that it is good in heat dissipation performance and it can disappear in a short time. Therefore, when a multiplicity of small-sized bubbles are thus successively formed so as to increase the flow resistance in the branch channel $A_2$, control of the flow direction at the channel branching section can be performed more flexibly and rapidly, as compared with the case where a large-sized bubble is generated singly.

Incidentally, while the case of irradiating the heat accumulating layer $a_3$ with the bubble-generating laser beam $L_2$ has been described above, it is naturally possible, as has been mentioned referring to FIG. 5 formerly, to directly irradiate with the bubble-generating laser beam $L_2$ the dispersion solvent introduced into the branch channel $A_2$, in place of the heat accumulating layer $a_3$, and to heat and evaporate the dispersion solvent, thereby generating the bubble or bubbles in the same manner as above.

As has been described above, in the particulate sampling apparatus K, the flow direction of the dispersion solvent in the channel branching section is controlled by the bubble generated in the channel, whereby sampling of particulates can be achieved. Therefore, especially in the case of sampling cells, unlike in the methods utilizing electric charging or optical pressure according to the related art, damages to the cells due to the application of electric charge or laser beam directly to the cells can be restrained, and the survival rate and/or activity of the cells after sampling can be enhanced.

In addition, by the scanning of the measuring laser beam $L_1$ and the bubble-generating laser beam $L_2$ by the scanning unit 3, the optical measurement and sampling of the particulates can be performed simultaneously for a plurality of channels arranged on a substrate. Therefore, the speed of the sampling treatment can be enhanced.

Furthermore, control of sampling can be achieved by only using an optical system (particularly, for light modulation control) relevant to the bubble-generating laser beam $L_2$. In addition, as has been described referring to FIG. 1 above, the optical systems relevant to the measuring laser beam $L_1$ and the bubble-generating laser beam $L_2$ can be configured by use of the same objective lens 4 (and scanning unit 3), within the tolerance of optical aberration of the objective lens 4. Therefore, the apparatus can be markedly reduced in size, and the manufacturing cost thereof can be suppressed. Similarly, the substrate do not need any complicated configuration such as electrodes, moving parts, driving pipeline, etc., so that the substrate can be formed by molding or nano-imprinting alone. This makes it possible to provide a substrate which is low in manufacturing cost and easy to handle.

The particulate sampling apparatus and the like according to embodiments of the present invention can be used for chemical and biological analyses of particulates, and contributes to enhancing the speed, efficiency and degree of integration of the analyses and to a reduction in size of the analyzing apparatus, and so on.

Besides, in the case of sampling cells, the particulate sampling apparatus and the like make it possible to sample the cells with less damage to the cells, and, therefore, the particulate sampling apparatus and the like are expected to be utilized in the field of regenerative therapy for the purpose of separation of stem cells.

It should be understood by those skilled in the art that various modifications, combinations, sub-combinations and alterations may occur depending on design requirements and other factors insofar as they are within the scope of the appended claims or the equivalents thereof.

What is claimed is:

1. A particulate sampling apparatus configured to control the flow direction of a dispersion solvent for particulates, at a channel branching section of a channel comprising:

an introduction channel capable of introducing said dispersion solvent; and a plurality of branch channels communicating with said introduction channel, so as to disperse desired ones of said particulates into a selected one of said branch channels; wherein said apparatus includes light irradiation means by which a bubble can be generated in said dispersion solvent by irradiation with a measuring laser beam directed to a first scanning line, and a bubble-generating laser beam used as a heat source directed to a second scanning line, and the flow direction of said dispersion solvent at said channel branching section is controlled by said bubble.

2. The particulate sampling apparatus as set forth in claim 1, wherein said light irradiation means is so configured as to be able to generate said bubble in said dispersion solvent in said branch channel, and the flow direction of said dispersion solvent at said channel branching section is controlled on the basis of an increase in flow resistance inside said branch channel due to said generated bubble.

3. The particulate sampling apparatus as set forth in claim 2, wherein said light irradiation means includes a beam scanning unit operative to scanningly apply said bubble-generating laser beam to said branch channel or to a chamber communicating with said introduction channel.

4. The particulate sampling apparatus as set forth in claim 3, wherein said light irradiation means further includes a light modulating unit configured to control the intensity of said laser beam used for irradiation.

5. The particulate sampling apparatus as set forth in claim 1, wherein said channel is disposed on a substrate.

6. A particulate sampling method, at a channel branching section of a channel, comprising:

an introduction channel capable of introducing a dispersion solvent; and a plurality of branch channels communicating with said introduction channel; wherein said particulate sampling method includes the steps of controlling the flow direction of a dispersion solvent for particulates, and dispersing desired ones of said particulates into a desired one of said branch channels by generating a bubble in said dispersion solvent by irradiation with a laser beam used as a heat source, and the flow direction of said dispersion solvent at said channel branching section is controlled by said bubble.

7. A particulate sampling apparatus configured to control the flow direction of a dispersion solvent for particulates, at a channel branching section of a channel comprising:

an introduction channel capable of introducing said dispersion solvent; and a plurality of branch channels communicating with said introduction channel, so as to disperse desired ones of said particulates into a selected one of said branch channels; wherein said apparatus includes light irradiation means by which a bubble can be generated in said dispersion solvent by irradiation with a laser beam used as a heat source, and the flow direction of said dispersion solvent at said channel branching section is controlled by said bubble, said light irradiation means is so configured as to be able to generate said bubble in said dispersion solvent in a chamber communicating with said introduction channel, and the flow direction of said dispersion solvent at said channel branching section is controlled on the basis of the discharge pressure of said dispersion solvent discharged from, said chamber due to said generated bubble.

8. The particulate sampling apparatus as set forth in claim 7, wherein said light irradiation means includes a beam scanning unit operative to scanningly apply said laser beam to said branch channel or said chamber.

9. The particulate sampling apparatus as set forth in claim 8, wherein a plurality of said channels are provided a plurality of said chambers are provided; and said beam scanning unit is so configured as to be able to scanningly apply said laser beam to said branch channels or said chambers of said plurality of channels.

10. The particulate sampling apparatus as set forth in claim 7, wherein the aperture diameter of a communicating port through which said chamber communicates with said introduction channel is smaller than the diameter of said particulates.

* * * * *